Dec. 2, 1924.  H. JUNKERS  1,517,633
CORRUGATED SHEET METAL
Filed June 28, 1920
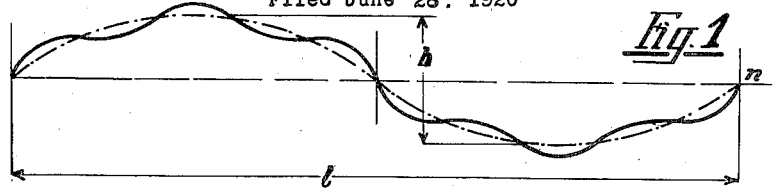
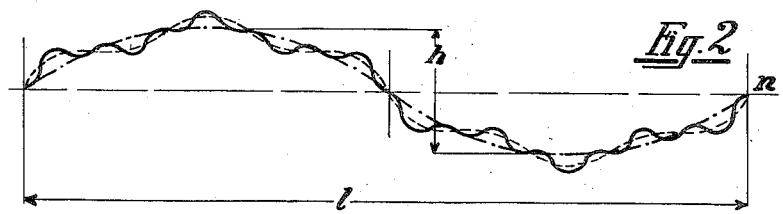
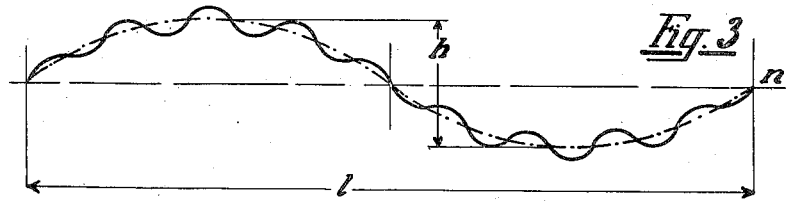
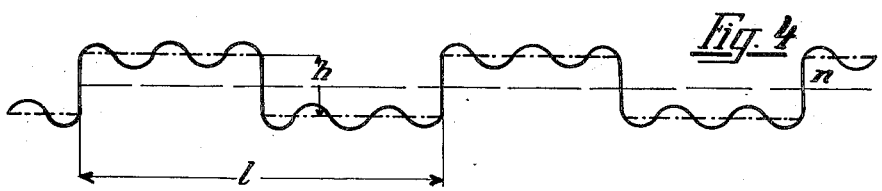
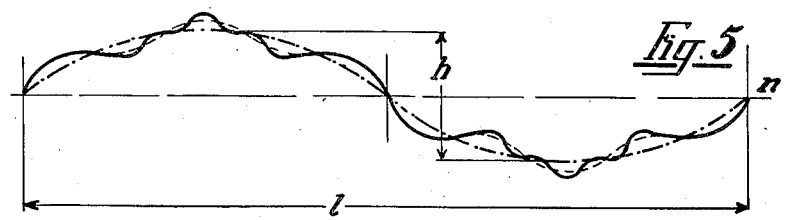
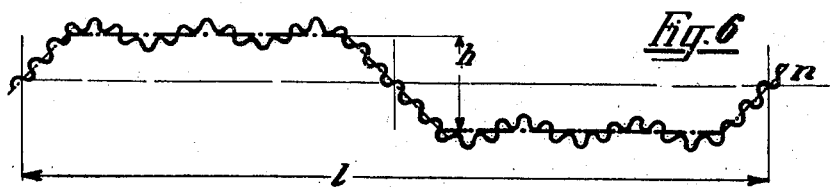
Inventor:
Hugo Junkers Patented Dec. 2, 1924.

1,517,633

UNITED STATES PATENT OFFICE.

HUGO JUNKERS, OF DESSAU, GERMANY.

CORRUGATED SHEET METAL.

Application filed June 28, 1920. Serial No. 392,592.

*To all whom it may concern:*

Be it known that I, HUGO JUNKERS, a citizen of the German Empire, residing at Dessau, Germany, have invented certain new and useful Improvements in Corrugated Sheet Metal, of which the following is a specification.

My invention relates to corrugated sheet metal and more especially to a novel profile or cross-sectional configuration of such corrugated sheet metal. In various cases of application of corrugated sheet metal, for instance in using same in the construction of walls in flying machines, the problem arises of supporting heavy loads per unit of surface, at the same time keeping the weight of the corrugated sheet metal as low as possible, although the distance between the supporting members is relatively great.

In order to comply with the requirement of small weight sheet metal of very slight thickness has to be employed. However, such sheet metal involves the disadvantage of the point of maximum load at which permanent deformation or destruction of the sheet metal will take place, being as a rule much lower than would be assumed from the customary rules of strength or resistance. As has been ascertained by experiments, this is caused thereby, that in those parts of a corrugated sheet metal, whose thickness is very slight in proportion to the corrugation, on their being subjected to pressure or breaking stress, a local formation of folds will occur already before the maximum load is reached, such formation of folds continuously spreading farther and ultimately causing a premature crushing or crumpling of the whole sheet.

According to the present invention the rigidity of corrugated sheet metal is increased by superposing to the main or primary corrugation secondary corrugations of smaller radii. For I have ascertained that the crumpling of sheet metal of a given thickness and load is the more retarded, the more the sheet is curved at the point in question, in other words, the smaller the average radius of curvature at that point. If now the secondary corrugation superposed to the main corrugation is curved too slightly in proportion to the thickness of the sheet, so that the danger of the sheet crumpling locally is still present, a tertiary corrugation of a still greater curvature may be superposed to the secondary corrugation, and so on.

According to the present invention the superposing of corrugations of a higher order to corrugations of a lower order is effected primarily at those points which are most exposed to crumpling, that is those points, which are subjected to strong pressure and more especially those portions of the main corrugation, which are remote from the neutral plane of the corrugated metal, and of these portions again those points which are comparatively slightly curved. As the direction in which the corrugated sheet metal is subjected to strains, changes, according to the manner in which it is used, the corrugations of the higher order will in general be arranged relatively to corrugations of the lower order in symmetry with the neutral plane. With corrugated sheet metal, which is always subjected to strains in a predetermined direction only, the corrugations of the higher order need only be arranged on that side of the neutral plane which is subjected to pressure.

In the drawings affixed to this specification and forming part thereof several embodiments of the present invention are illustrated in a diagrammatical manner, the full lines indicating sections of the novel profile, while the primary profile (main corrugation) is shown in dotted lines, the neutral plane being indicated by $n$, the length of the main corrugation by $l$ and its height by $h$.

Figure 1 shows a sinus-shaped main corrugation in dot and dash line with a superposed sinus-shaped secondary corrugation extending uniformly throughout the main corrugation, in full line.

Figure 2 shows a secondary corrugation in dash dash line superposed upon a sinus-shaped main corrugation delineated by a dot and dash line, and a tertiary corrugation in full line superposed upon the secondary corrugation, the corrugations of the higher order extending uniformly throughout those of a lower order.

Figure 3 shows a sinus-shaped main corrugation with a superposed secondary corrugation increasing in height and average curvature from the neutral plane toward those points of the main corrugation which are most heavily subjected to flexion.

Figure 4 shows a main corrugation of rectangular configuration, in which a secondary corrugation is arranged only at the external planes while the vertically extending walls of the main corrugation have no secondary corrugations.

Figure 5 shows a sinus-shaped corrugation having tertiary corrugations superposed only upon those portions of the secondary corrugations extending over the entire main corrugation which are subjected to the most heavy strains.

Figure 6 shows a main corrugation of trapezoidal profile depicted by a dash and dot line, those parts of said corrugations which are remote from the neutral plane being provided with sinus-shaped secondary corrugations, and tertiary corrugations depicted in full lines extending throughout the main corrugation.

Apart from the illustrated forms of corrugations various further combinations of the different kinds of corrugations are possible Thus for instance the corrugations of the higher order may have other than sinus shapes, such as for instance rectangular, triangular or trapezoidal shapes.

I claim:—

1. Corrugated sheet metal having main corrugations, secondary corrugations superposed on the main corrugations, and tertiary corrugations on the secondary ones.

2. Corrugated sheet metal having corrugations of a higher order superposed to the main corrugations, the average curvature of the corrugations of a higher order increasing towards the points of higher stress.

3. Corrugated sheet metal having corrugations of higher orders superposed to the main corrugations, the corrugations of higher order extending partly over an entire main corrugation and partly only over those portions of a main corrugation which are designed to take up high strains.

4. Corrugated sheet metal comprising in combination, flat primary corrugations and corrugations of a higher order uniformly distributed over the said primary corrugations.

5. Corrugated sheet metal composed of primary corrugations and superposed secondary and tertiary corrugations extending continuously throughout the primary corrugations.

6. Corrugated sheet metal for aeroplane construction having main corrugations, each main corrugation being composed of a plurality of secondary corrugations, said secondary corrugations varying in degree of curvature from the neutral plane.

7. Corrugated sheet metal having main corrugations each main corrugation being composed of a plurality of secondary corrugations, the degree of curvature of said secondary corrugations increasing toward the points of application of greatest stress to the surface of the metal.

8. Corrugated sheet metal for aeroplane construction having main corrugations, secondary corrugations extending continuously throughout the plane of the main corrugations, the secondary corrugations having tertiary corrugations at and throughout the point of application of greatest stresses to the sheet metal.

9. Corrugated sheet metal for aeroplane construction comprising main corrugations and superposed secondary corrugations increasing in height and average curvature from the neutral plane toward those points of the main corrugations most subjected to flexion.

In testimony whereof I affix my signature.

HUGO JUNKERS.